US006429657B1

(12) United States Patent
Blish, II

(10) Patent No.: US 6,429,657 B1
(45) Date of Patent: Aug. 6, 2002

(54) APPARATUS FOR IMPROVING IMAGE DEPTH RESOLUTION IN A MAGNETIC FIELD IMAGING APPARATUS

(75) Inventor: Richard C. Blish, II, Saratoga, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 17 days.

(21) Appl. No.: 09/757,116

(22) Filed: Jan. 9, 2001

(51) Int. Cl.[7] .................................................. G01V 3/00
(52) U.S. Cl. ........................ 324/322; 324/318; 324/313
(58) Field of Search ................................ 324/318, 322, 324/313, 244, 529, 750, 763, 719, 158

(56) References Cited

U.S. PATENT DOCUMENTS 6,084,396 A * 7/2000 Rao ........................ 324/158.1
6,201,401 B1 * 3/2001 Hellemans et al. ......... 324/719
6,331,782 B1 * 12/2001 White et al. ................ 324/763

OTHER PUBLICATIONS

Nixon, O CCD–Based Magnetic Field Imaging; IEEE Transections on Electron Devices; vol. 44, No. 10, Oct. 1997.*

Black, R. C. Magnetic Micriscopy Using a liquis Nirtogen Cooled Superconducting Quantum interference Device; Appl. Phys. Lett. vol. 62(17) 2128–2130, Apr. 1993.*

* cited by examiner

*Primary Examiner*—Edward Lefkowitz
*Assistant Examiner*—Brij B. Shrivastav

(57) ABSTRACT

A magnetic field imaging apparatus for sensing a magnetic field generated by current flowing in the semiconductor device includes a pair of sensing devices which may be focused at a chosen depth in a semiconductor device. The sensing devices may be movable so that they may be focused at different focal points. The apparatus may also include three or more sensing devices, which can be chosen to operate in tears to define a variety of focus depths in a semiconductor device.

8 Claims, 4 Drawing Sheets

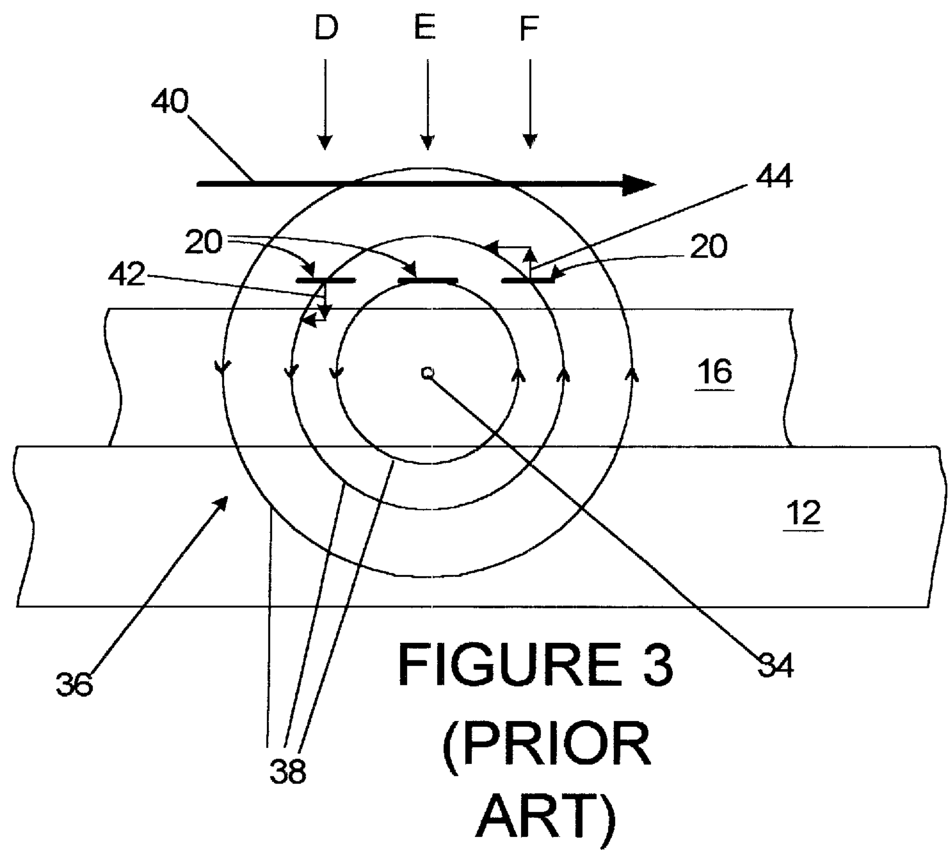
FIGURE 3 (PRIOR ART)
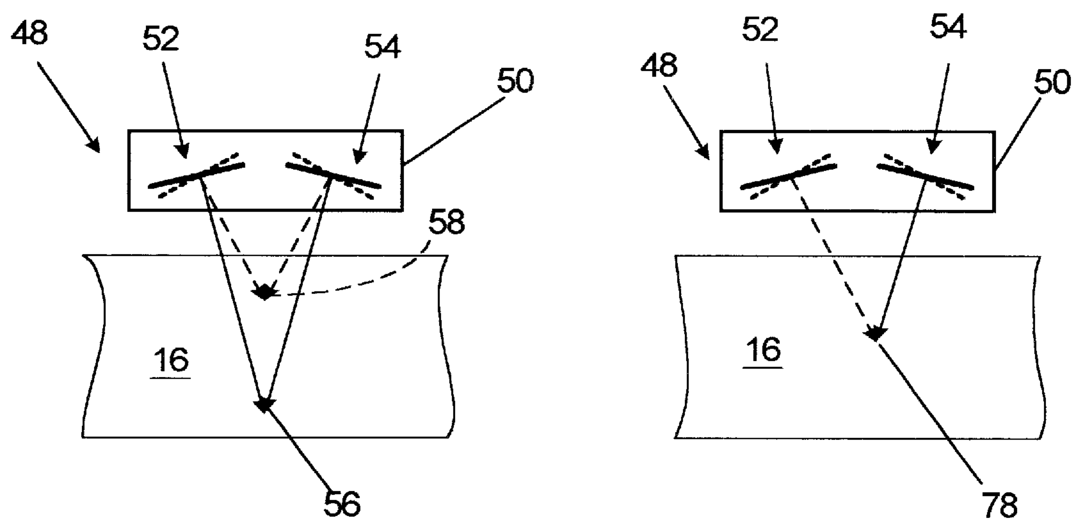
FIGURE 4
FIGURE 7

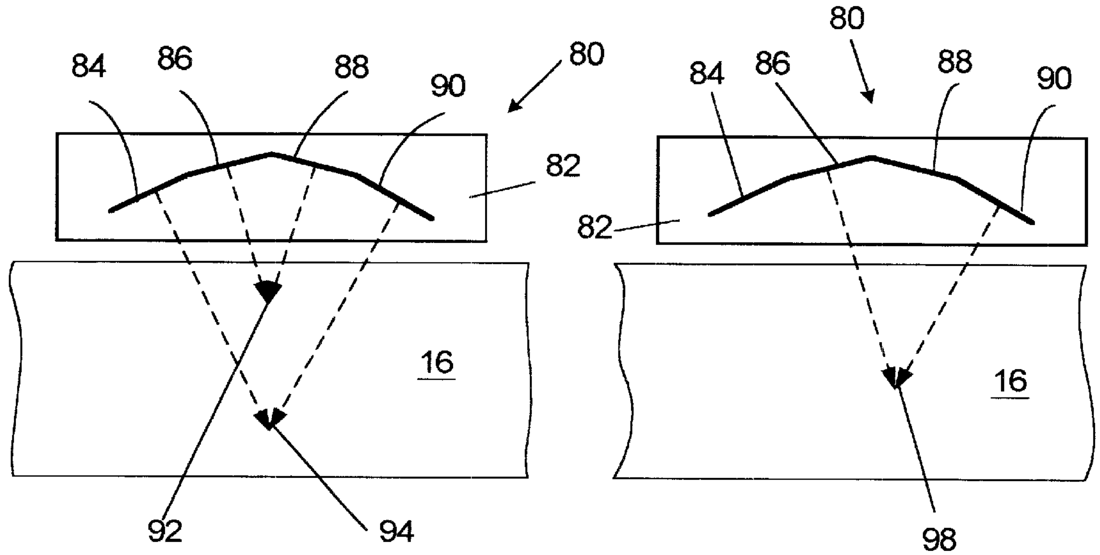
FIGURE 8
FIGURE 10
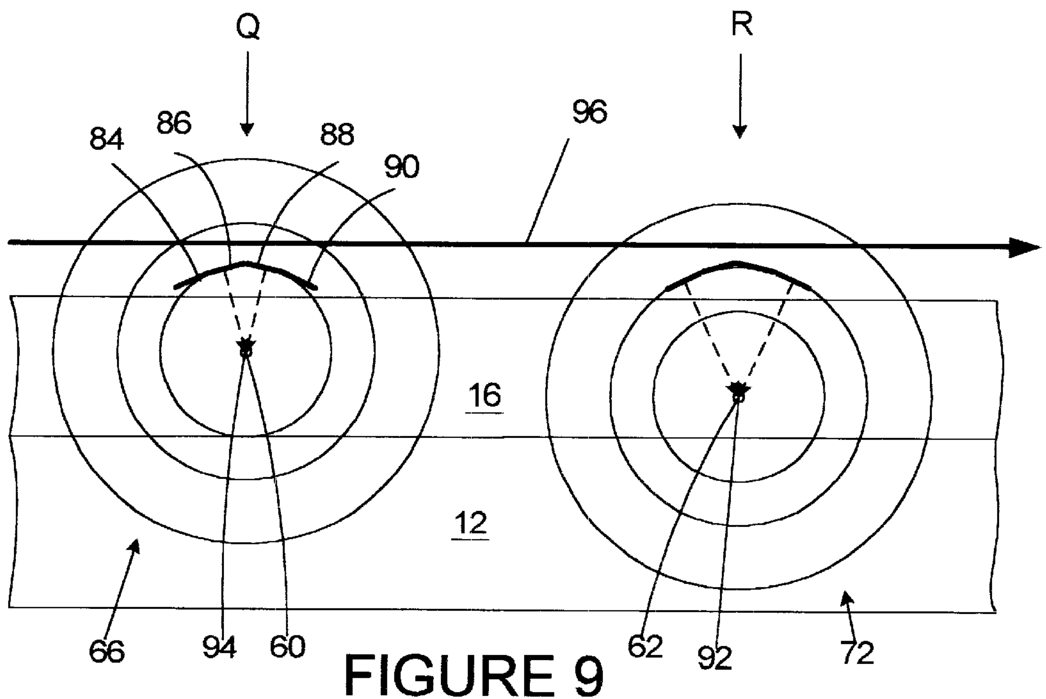
FIGURE 9

APPARATUS FOR IMPROVING IMAGE DEPTH RESOLUTION IN A MAGNETIC FIELD IMAGING APPARATUS

BACKGROUND OF THE INVENTION

1. Field of the Invention

This invention relates generally to failure analysis of semiconductor devices, and more particularly, to an apparatus which provides high image depth resolution in analyzing such devices.

2. Discussion of the Related Art

As is well known, in the event of failure of a semiconductor device, a non-destructive failure analysis is undertaking in order to gain an understanding of the nature of the failure, with the goal of taking appropriate steps to avoid such a failure in future devices. As is also well known, a large percentage of such failures are due to a short circuit within the device. Such a short circuit causes a high current to flow at that point in device.

In the past, a heat sensing apparatus has been used to sense increased heat caused by increased current flowing at the short-circuit. As an example, one can use the characteristics of an infrared imaging device, or the characteristics of a liquid crystal display failure analysis apparatus may be chosen so that the display changes from an opaque to a clear state above a chosen temperature, and vice versa. The display would then be capable of indicating a "hot spot" in the semiconductor device being analyzed, which would in turn indicate a short circuit.

Current semiconductor devices contain many, for example 10 or more, layers of metallization. With the many layers of metallization and the very small device dimensions involved, at best only general localization of a fault can be achieved.

Recently, a magnetic field imaging microscope has been introduced for undertaking failure analysis of semiconductor devices. An example is the Magma C-1 Magnetic Field Imaging Microscope, manufactured by Neocera, Inc. This apparatus uses a substantially flat superconducting sensor which is which is capable of detecting magnetic field intensity and direction perpendicular to the plane of the sensor. As the magnetic field induced by an electric current increases with increased current level, the sensor detects a higher magnetic field in the area of higher current, i.e., for example, a short circuit. A magnetic field image is obtained by scanning the semiconductor device with the sensor, and a software program converts the image into an image of current flow. The image produced is compared to a current flow image of a properly functioning device, so that the location of a fault can be better determined.

While such an apparatus provides advantages over the infrared and liquid crystal display systems described above, problems exist regard to depth resolution, i.e., the ability to discern which of the many layers in the semiconductor device may contain the fault which is imaged.

Therefore, what is needed is an apparatus which is capable of undertaking failure analysis of a semiconductor device in an effective manner with improved depth resolution.

SUMMARY OF THE INVENTION

The present invention is a magnetic field imaging apparatus for sensing a magnetic field generated by current flowing in a semiconductor device. The apparatus includes a pair of sensing devices which may be focused at a chosen depth in a semiconductor device. The sensing devices may be movable so that they may be focused at different focal points. The apparatus may also include three or more sensing devices, which can be chosen to operate in pairs or all together to define a variety of focus depths in a semiconductor device.

The present invention is better understood upon consideration of the detailed description below, in conjunction with the accompanying drawings. As will become readily apparent to those skilled in the art from the following description, there are shown and described embodiments of this invention simply by way of the illustration of the best mode to carry out the invention. As will be realized, the invention is capable of other embodiments and its several details are capable of modifications and various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as said preferred mode of use, and further objects and advantages thereof, will best be understood by reference to the following detailed description of an illustrative embodiment when read in conjunction with the accompanying drawings, wherein:

FIG. 3 is a view showing use of the apparatus on FIG. 1;

FIG. 4 is a view of a first embodiment of the invention;

FIG. 7 is a view similar to that shown in FIG. 4, but illustrating a different state of that embodiment;

FIG. 8 is a view of a second embodiment of the invention;

FIG. 9 is a view illustrating the use of the second embodiment of the invention, and FIG. 10 is a view similar to that shown in FIG. 8, but illustrating a different state of that embodiment.

DETAILED DESCRIPTION

Reference is now made in detail to specific embodiments of the present invention which illustrate the best mode presently contemplated by the inventor for practicing the invention.

Figure 1:
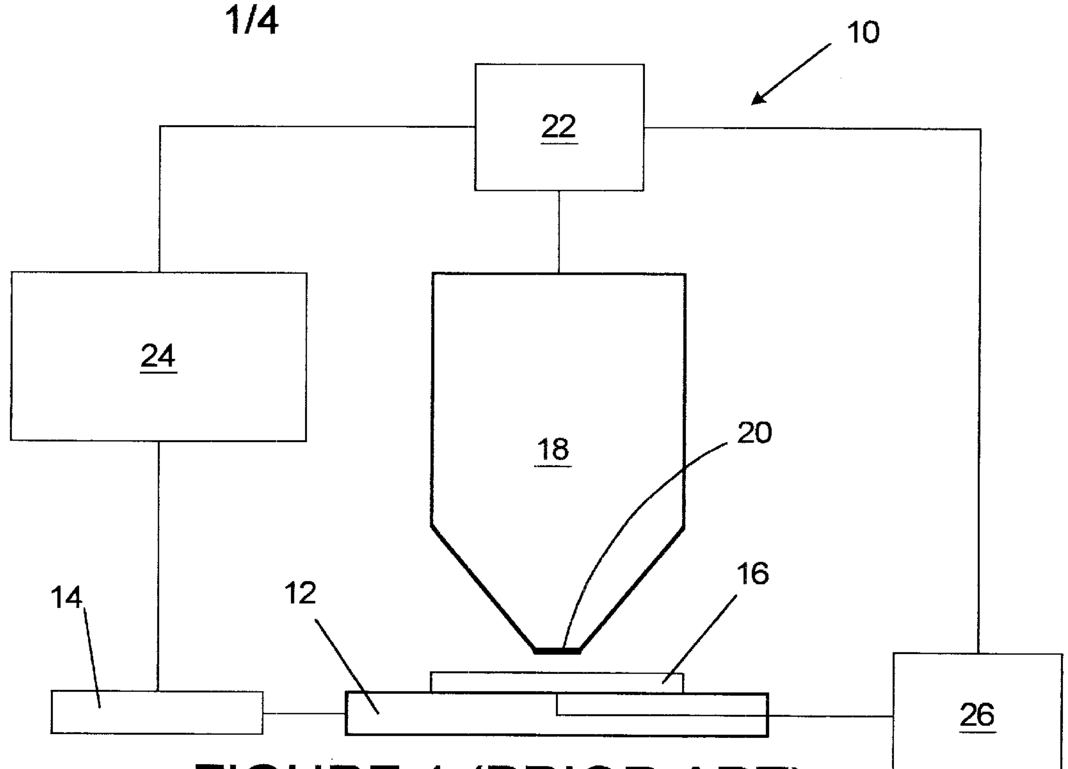
FIG. 1 is a block diagram of a magnetic field imaging apparatus of the prior art.

FIG. 1 shows a magnetic field imaging apparatus 10 of the type described above. The apparatus 10 includes a table 12 movable in the X–Y directions by motors 14. A sample in the form of a semiconductor device 16 is positioned on the table 12 and is movable therewith. A housing 18 is positioned over the table 12 and has mounted thereto a single magnetic sensing device 20 which is in close proximity to the semiconductor device 16. The sensing device 20 is capable of sensing a magnetic field generated by current flow in the semiconductor device 16. The sensed magnetic field level is amplified by an amplifier 22, and the output of the amplifier 22 is provided to a computer 24 which is in turn connected to the table motors 14. The computer 24 receives magnetic field imaging data from the sensing device 20 and provides an analysis of that data, and also provides input to the table motors 14 for motion control of the table 12. Information from the amplifier 22 is also provided to a function generator 26 connected to the semiconductor device 16, for running the semiconductor device 16 through its various functions.

Figure 2:
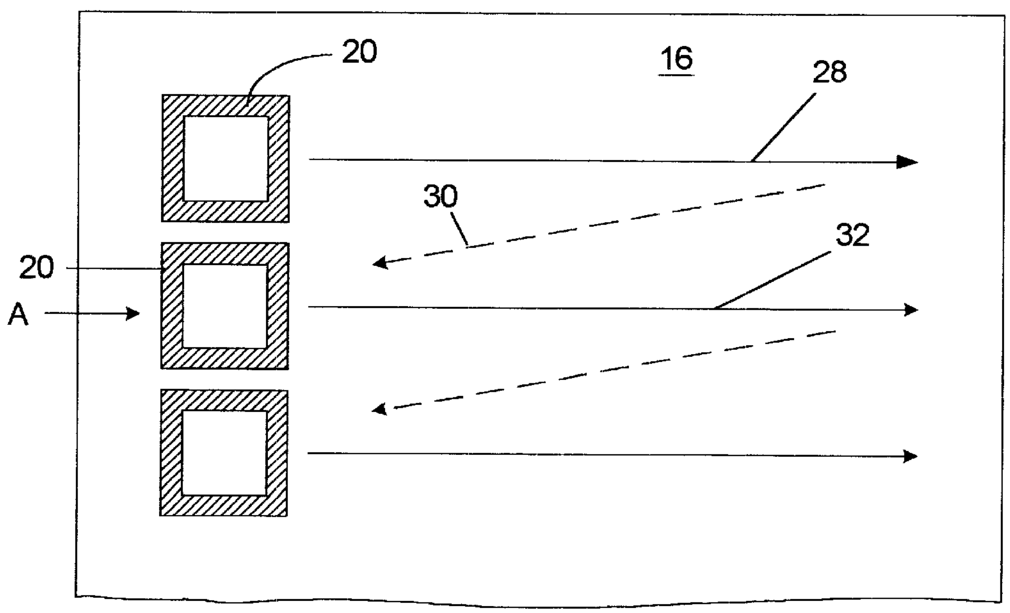
FIG. 2 is a plan view of a portion of the apparatus of FIG. 1, showing its operation.

The sensing device 20 is shown in FIGS. 2 and 3 overlying a sample semiconductor device 16 undergoing failure analysis. The sensing device 20 is a superconducting loop sensing device utilizing Josephson junctions. The sensing device 20 is substantially flat in configuration (FIG. 3), and is square in plan view (FIG. 2). As the table 12 (and the semiconductor device 16) are moved leftward relative to the sensing device 20 (FIGS. 2 and 3), the sensing device 20 scans across the semiconductor device 16 as indicated by the solid arrow 28, with the plane of the sensing device 20 parallel to the face of the semiconductor device 16. (It is equally effective to move the housing 18 instead of the table 12.) During this scan, the sensing device 20 moves through various magnetic fields induced by electric current in the semiconductor device 16. The sensing device 20 senses the component of a magnetic field which is perpendicular to the plane of the sensing device 20 and is capable of sensing higher and lower levels of magnetic field intensity induced by higher and lower levels of current in the semiconductor device 16, with a very high level or gradient of magnetic field possibly indicating a short circuit.

When the sensing device 20 completes a scan, and is at its most rightward position relative to the semiconductor device 16, the motors 14 move the table 12 to move the semiconductor device 16 to its fully rightward position, and the table 12 is caused to step upward relative to the sensing device 20 to bring the sensing device 20 into the positioned shown at A (see dotted arrow 30). The sensing device 20 is caused to again be scanned across the semiconductor device 16 (see solid arrow 32), and the steps are repeated as part of a raster pattern until the entire semiconductor device 16 is scanned. A magnetic field image is obtained, and a software program converts the image into an image of current flow. The image produced is compared to a current flow image of a properly functioning semiconductor device, so that the location of a fault can be better determined.

FIG. 3 illustrates a single scan of the sensing device 20 relative to a semiconductor device 16 which contains a current-carrying conductor 34. The flow of current in the conductor 34 induces a magnetic field 36 the flux lines of which are indicated at 38. As relative movement is provided between the sensing device 20 and the semiconductor device 16 (see arrow 40 indicating relative movement between the sensing device 20 and semiconductor device 16), the sensing device 20, with its plane substantially parallel to the face of the semiconductor device 16 and moving parallel to the face of the semiconductor device 16 senses the magnetic field 36 induced by the current in the conductor 34. The sensing device 20 senses the magnitude of the component of the magnetic field 36 which is perpendicular to the plane of the sensing device 20. With the sensing device 20 in a first position D relative to the semiconductor device 16, the component of the magnetic field 36 sensed by the sensing device 20 is indicated by the arrow 42. As the sensing device 20 is moved to a second position E relative to the semiconductor device 16, directly over the conductor 34, it will be seen that the component of the magnetic field 36 which is perpendicular to the plane of the sensing device 20 is substantially zero. This is because the plane of the sensing device 20 lies substantially parallel to the lines of magnetic flux 38. Then, as the sensing device 20 moves to a third position F relative to the semiconductor device 16, the component of the magnetic field 36 sensed by the sensing device 20 is indicated by the arrow 44.

As pointed out above, with the sensing device 20 directly over the conductor 34, the magnetic field 36 induced by the current in the conductor 34 has substantially no component which is perpendicular to the plane of the sensing device 20, and the sensed value falls to substantially zero. These data can be used as an indication of the position of the conductor 34 in the semiconductor device 16 along the direction indicated by the arrow 40. However, the sensing device 20 is not capable of determining the depth of the conductor 34 in the semiconductor device 16. That is to say, the magnitude of the components indicated by arrows 42, 44 will vary depending on the level of current in the conductor 34 (greater magnitude for greater current, lower magnitude for lower current), and/or the distance of the sensing device 20 from the conductor 34 (greater magnitude for lower distance, lower magnitude for greater distance). Thus, it will be seen that the described apparatus is incapable of determining the depth in the semiconductor device 16 at which current is flowing.

As noted, modern semiconductor devices may contain ten or more layers of metallization. The layer which may contain a fault in the form of a high current short cannot be determined by the above apparatus, representing a severe limitation in semiconductor device failure analysis.

FIG. 4 shows a first embodiment of structure 48 for sensing a magnetic field generated by current flowing in a semiconductor device 16, which structure 48 replaces the sensing device 20 of FIG. 1–3. The structure 48 includes a support 50 having first and second sensing devices 52, 54 mounted thereto. Each of the sensing devices 52, 54 may be of the type described above with regard to FIGS. 1–3, each such device 52, 54 being a superconducting magnetic sensing device utilizing Josephson junctions (each with its own bridge and reference elements), substantially flat in configuration and square in plan view. Each of the sensing devices 52, 54 is movably mounted to the support 50, i.e., each device can 52, 54 be of pivoted so that the plane thereof is at a chosen angle relative to the face of the semiconductor device 16. That is, for example, the sensing devices 52, 54 can be moved from the positions indicated by solid lines to the positions indicated by dotted lines in FIG. 4, and to various positions other positions. Positioning the sensing devices in their respective solid line positions and dotted line positions causes the sensing devices 52, 54 to "focus" at different focal points 56, 58 which are at different depths in the semiconductor device 16, as will be shown and described.

Figure 5:
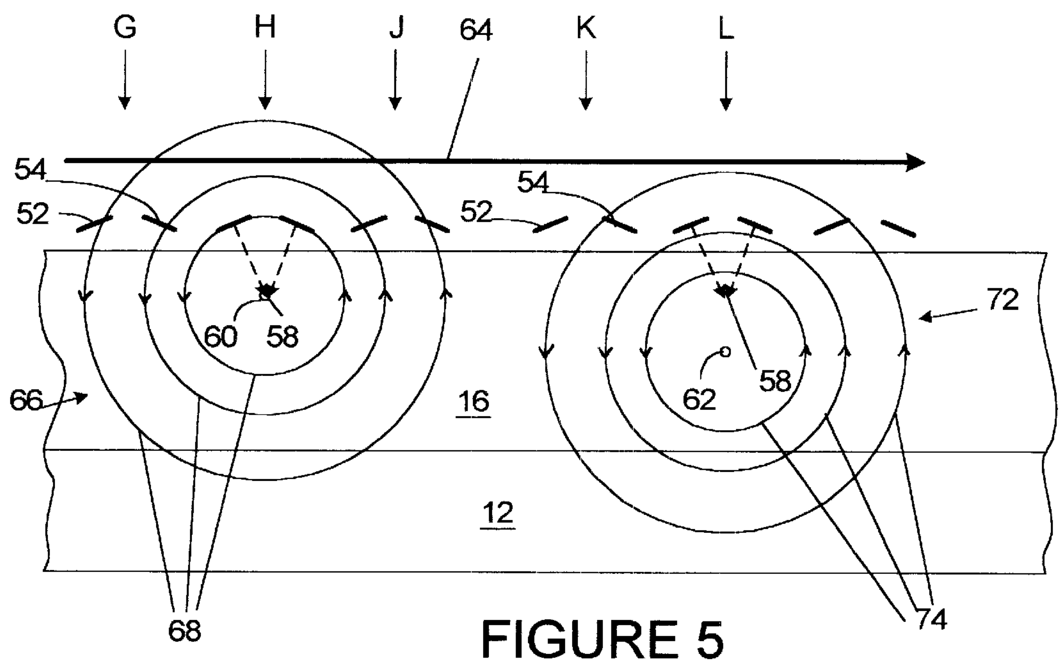
FIGS. 5 and 6 are views illustrating use of the apparatus of FIG. 4.

With reference to FIG. 5, a semiconductor device 16 contains current carrying conductors 60, 62 at different depths in the semiconductor device 16, i.e., at different distances from the face thereof. The sensing devices 52, 54 are positioned as indicated by dotted lines in FIG. 4. As the table 12 and the semiconductor device 16 are moved leftward relative to the sensing devices 52, 54 (relative movement between the sensing devices 52, 54 and semiconductor device 16 indicated by arrow 64), the sensing devices 52, 54 scan across the semiconductor device 16. With the sensing devices 52, 54 in their most leftward relative position as shown at G, each sensing device 52, 54 senses a component of the magnetic field 66 (induced by current in conductor 60) which is perpendicular to its plane. As the sensing devices 52, 54 and semiconductor device 16 move relatively further, the sensing devices 52, 54 reach the position shown at H. In this position, the focal point 58 of sensing devices 52, 54 coincides with the position of the conductor 60 and the depth thereof in the semiconductor device 16, and the neither of the sensing devices 52, 54 senses a magnetic field component, since there is no substantial magnetic field component which is perpendicular to either of the sensing devices 52, 54, i.e., the respective planes of the sensing devices 52, 54 lie generally parallel to the magnetic flux lines 68. This is an indication that the conductor 60 lies directly beneath the sensing devices 52, 54. As the sensing devices 52, 54 and semiconductor device 16 moved relatively further to position J, each of the sensing devices 52, 54 again senses a component of the magnetic field 66 which is perpendicular to its plane. Thus a profile of the magnetic field 66 adjacent the conductor 16 can be obtained.

As the sensing devices 52, 54 continue their scan across the semiconductor device 16 (relative movement of the sensing devices 52, 54 indicated by arrow 64), they move away from the current carrying conductor 16 and toward the current carrying conductor 62. With the sensing devices 52, 54 in the position shown at K, the sensing devices 52, 54 sense components of the magnetic field 72 which are perpendicular to their respective planes. It will be noted, however, that when the sensing devices 52, 54 move to the position shown at L, they do not lie parallel to magnetic flux lines 74 induced by the current in the conductor 62, but are angled relative thereto. In its state, they will continue to sense components of the magnetic field 72 which are perpendicular to their respective planes. These components are smaller in magnitude than the components sensed by the sensing devices 52, 54 in the position K. In fact, these components are at their minimum as the devices 52, 54 scan across the portion of the semiconductor device 16 containing the conductor 62, but they do not fall to substantially zero as previously described with regard to conductor 60. This is because the conductor 62 is deeper in the semiconductor device 16 than the conductor 60, and the sensing devices 52, 54, focused at a focal point 58 which coincides with the depth of the conductor 60, are not focused at a focal point which coincides with the depth of the conductor 62 (see FIG. 5).

Figure 6:
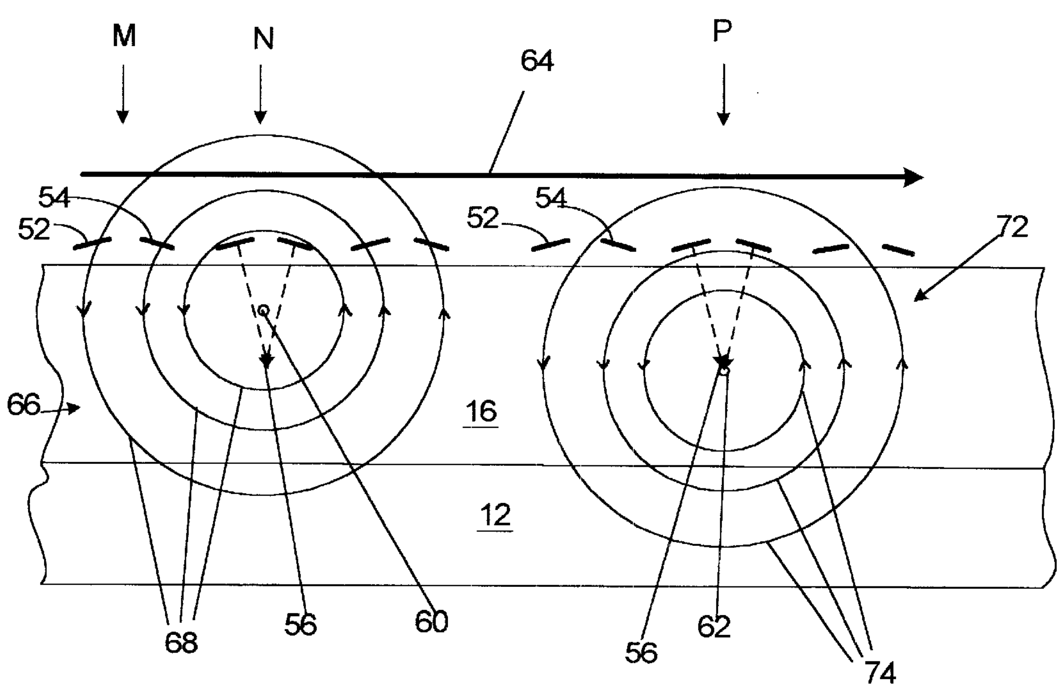

FIG. 6 is similar to FIG. 5, but with the sensing devices 52, 54 moved to the positions shown in full lines in FIG. 4. That is, the angle of the plane of each sensing device 52, 54 with respect to the face of the semiconductor device 16 is less than that of FIG. 5. This causes the sensing devices 52, 54 to focus at a focal point 56 different from that shown in FIG. 5, this focal point 56 being at a greater depth in the semiconductor device 16 than the focal point 58.

With reference to FIG. 6, again, the semiconductor device 16 contains current carrying conductors 60, 62 at different depths in the semiconductor device 16, i.e., at different distances from the face thereof. As the table 12 and the semiconductor device 16 are moved leftward relative to the sensing devices 52, 54 (relative movement between the sensing devices 52, 54 and semiconductor device 16 indicated by arrow 64), the sensing devices 52, 54 scan across the semiconductor device 16. With the sensing devices 52, 54 in their most leftward position as indicated at M, each sensing device 52, 54 senses a component of the magnetic field 66 (induced by current in the conductor 60) which is perpendicular to its plane. As the sensing devices 52, 54 and semiconductor device 16 move relatively further, the sensing devices 52, 54 reach the position shown at N. It will be noted that when the sensing devices 52, 54 are in this position, neither of their planes lie parallel to magnetic flux lines 68 induced by the current in the conductor 60. This is because the sensing devices 52, 54 are not focused at a focal point coinciding with the conductor 60. However, as the table 12 and semiconductor device 16 are moved relatively further (relative movement between the sensing devices 52, 54 and the semiconductor device indicated by arrow 64), the sensing devices 52, 54 reach the position P, sensing the magnetic field 72 induced by current in the conductor 62, which is at a lower level, i.e., and a greater depth in the semiconductor device 16 than the conductor 60. In this position, neither sensing device 52, 54 senses any substantial magnetic field component, since there is no substantial magnetic field component which is perpendicular to the plane of either of the sensing devices 52, 54, i.e., the respective planes of the sensing devices 52, 54 lie generally parallel to magnetic flux lines 74 of the magnetic field 72. Thus, the sensing devices 52, 54 are focused to determine a focal point 56 which coincides with the depth of the conductor 62.

The sensing devices 52, 54, being movable relative to the support 50, can be focused at a variety of focal points, so as to be focused at a variety of depths in a semiconductor device 16 being scanned. Thus, the depth at which current is flowing can be determined, aiding greatly in the failure analysis process.

A change in focal point in accordance with this invention also can be achieved by changing the position of only one sensing device, as illustrated with reference to FIG. 7. That is, with only the sensing device 54 is changed from its dotted line position to its solid line position, and with the other sensing device 52 remaining in its dotted line position, the focal point changes to point 78, which focal point 78 aiding is deeper into the semiconductor device 16 than the focal point 58, but less deep into the semiconductor device 16 than the focal point 56.

FIG. 8 shows a second embodiment of structure 80 aiding for sensing a magnetic field generated by current flowing in a semiconductor device 16, which structure 18 replaces the sensing device 20 of FIGS. 1–3. In this embodiment, the structure 80 includes a support 82 having first, second, third and fourth sensing devices 84, 86, 88, 90, each of which may take the form shown in FIGS. 1–3, secured thereto. That is, each of the sensing devices 84, 86, 88, 90 is again a superconducting magnetic sensing device utilizing Josephson junctions, and is substantially flat in configuration and square in plan view. The sensing devices 84, 86, 88 90 are generally arranged in an arc-shaped configuration, as shown. The sensing devices 86, 88 are focused at a focal point 92, and the sensing devices 84, 90 are focused at a focal point 94 different from the focal point 92, further away from the support 82 and deeper into the semiconductor device 16 than the focal point 92 defined by the sensing devices 84, 90.

With reference to FIG. 9, again, a semiconductor device 16 contains current carrying conductors 60, 62 at different depths, i.e., at different distances from the face thereof. As the table 12 and the semiconductor device 16 are moved leftward relative to the sensing devices 84, 86, 88, 90 (relative movement between the sensing devices 84, 86, 88, 90 and the semiconductor device 16 indicated by arrow 96), the sensing devices 84, 86, 88, 90 scan across the semiconductor device 16. With the sensing devices 84, 86, 88, 90 in the position indicated at Q, the pair of sensing devices 86, 88 focus at a first semiconductor device depth corresponding to the depth of the conductor 60, and data from the sensing devices 86, 88 can be used to determine the depth of that conductor 60, in accordance with the above description. With further movement of the table 12 and semiconductor device 16 relative to the sensing devices 84, 86, 88, 90, the sensing devices take the position shown at R, wherein the pair of sensing devices 84, 90 focus at a second semiconductor device depth corresponding to the depth of the conductor 62, and data from the sensing devices 84, 90 can be used to determine depth of that conductor 62.

As indicated in FIG. 10, various pairs of the sensing devices 84, 86, 88, 90 of the structure 80 of FIG. 8 can be selected to determine various focal points at different depths in the semiconductor device 16. For example, sensing device 86 and sensing device 90 determine a focal point 98 which is deeper in the semiconductor device 16 than the focal point 92 defined by sensing device 86 and sensing device 88, but shallower than the focal point 94 defined by sensing device 84 and sensing device 90.

It will be understood that more than two of the sensing devices 84, 86, 88, 90, for example three, or all four, may be used simultaneously to define a plurality of focal points as the semiconductor device is scanned or multiple pairs of sensing devices may also be used simultaneously in the same manner. Furthermore, it will be appreciated that the physical ordering of sensing devices 84, 86, 88, 90 need not necessarily be in an arc. For example, matched pairs with complementary till angles (see for example sensing devices 86, 88) may be positioned next to each other, etc.

It will be seen that in accordance with the embodiments shown and described, the depth of current flow in a semiconductor device, for example high current flow caused by a short circuit in the semiconductor device, can be determined, greatly aiding in failure analysis undertaken on such a semiconductor device.

The foregoing description of the embodiments of the invention have been presented for purposes of illustration and description. It is not intended to be exhaustive or to limit the invention to the precise form disclosed. Other modifications or variations are possible in light of the above teachings.

The embodiments were chosen and described to provide the best illustration of the principles of the invention and its practical application to thereby enable one of ordinary skill of the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A magnetic field imaging apparatus for sensing a magnetic field generated by current flowing in a semiconductor device, the magnetic field imaging apparatus comprising a support and first and second sensing devices mounted to the support, the first and second sensing devices provided for sensing a magnetic field generated by current flowing in the semiconductor device, the support and the semiconductor device being capable of relative movement, the first and second sensing devices being focused at a chosen focal point relative to the support.

2. The apparatus of claim 1 wherein the first sensing device is movable relative to the support so that the first and second sensing devices may be focused at another focal point relative to the support.

3. The apparatus of claim 1 wherein the first and second sensing devices are movable relative to the support so that the first and second sensing devices may be focused at various focal points relative to the support.

4. The apparatus of claim 1 and further comprising a third sensing device mounted to the support, wherein a combination of the third sensing device and one of the first and second sensing devices are focused at an additional focal point relative to the support.

5. The apparatus of claim 4 were in the first, second and third sensing devices are in a generally arc-shaped configuration.

6. The apparatus of claim 1 and further comprising third and fourth sensing devices mounted to the support, the third and fourth sensing devices being focused at a different focal point relative to the support.

7. The apparatus of claim 6 were in the first, second, third and fourth sensing devices are configured generally in an arc-shaped configuration.

8. The apparatus of claim 1 wherein the sensing devices are superconducting sensing devices.

* * * * *